(12) United States Patent
Atherton et al.

(10) Patent No.: US 12,240,543 B2
(45) Date of Patent: Mar. 4, 2025

(54) VEHICLE TRACK PAD ASSEMBLY AND METHOD

(71) Applicant: Westinghouse Air Brake Technologies Corporation, Pittsburgh, PA (US)

(72) Inventors: Rick Atherton, Fayetteville, NC (US); John Bennett Goodloe, Fayetteville, NC (US); Martin Petzoldt, Whispering Pines, NC (US); Jason Gardner, Maxton, NC (US); James Sugg, Maxton, NC (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 644 days.

(21) Appl. No.: 17/526,229

(22) Filed: Nov. 15, 2021

(65) Prior Publication Data

US 2022/0219772 A1   Jul. 14, 2022

Related U.S. Application Data

(60) Provisional application No. 63/135,536, filed on Jan. 8, 2021.

(51) Int. Cl.
*B62D 55/28* (2006.01)
*B62D 55/20* (2006.01)
*B62D 55/06* (2006.01)

(52) U.S. Cl.
CPC ............ *B62D 55/28* (2013.01); *B62D 55/20* (2013.01); *B62D 55/06* (2013.01)

(58) Field of Classification Search
CPC ....... B62D 55/28; B62D 55/26; B62D 55/275
See application file for complete search history.

(56) References Cited

U.S. PATENT DOCUMENTS

| | | | |
|---|---|---|---|
| 2,314,355 A | 3/1943 | Knox | |
| RE24,331 E | 6/1957 | Proske | |
| 2,964,361 A * | 12/1960 | Hansen | B62D 55/28 305/191 |
| 3,261,646 A | 7/1966 | Pax | |
| 3,870,380 A | 3/1975 | Korner | |
| 4,098,543 A * | 7/1978 | Sturges | B62D 55/28 305/189 |
| 4,262,972 A | 4/1981 | Falk | |
| 4,700,992 A | 10/1987 | Cory | |

(Continued)

FOREIGN PATENT DOCUMENTS

| | | |
|---|---|---|
| EP | 2045176 A1 | 4/2009 |
| JP | H03220071 A | 9/1991 |
| JP | 3063033 B2 | 7/2000 |

OTHER PUBLICATIONS

Pocket Dentistry "Adhesives and Bonding in Orthodontics" (1 page).

*Primary Examiner* — Jason R Bellinger
(74) *Attorney, Agent, or Firm* — K&L Gates LLP

(57) ABSTRACT

A track pad assembly for a continuous track vehicle includes a track plate and a polymer pad. The track plate includes a plate body having a tread surface, and one or more mesh arrays attached to the tread surface of the plate body. The polymer pad is attached to the mesh array(s) and to interstitial areas of the tread surface defined by cells of the mesh array(s), e.g., by press bonding in conjunction with an adhesive. The polymer pad may be made of an elastomer such as hardened rubber.

21 Claims, 8 Drawing Sheets

(56) References Cited

U.S. PATENT DOCUMENTS

| | | | |
|---|---|---|---|
| 5,388,900 A * | 2/1995 | Suzuki | B62D 55/275 |
| | | | 305/51 |
| 6,533,371 B2 | 3/2003 | Hori et al. | |
| 6,843,876 B1 | 1/2005 | Kent | |
| 10,308,298 B2 * | 6/2019 | Chiang | B62D 55/26 |
| 11,084,545 B2 * | 8/2021 | Hall | B62D 55/26 |
| 11,370,500 B2 * | 6/2022 | Gallagher | B62D 55/275 |
| 11,459,042 B2 * | 10/2022 | Chiang | B62D 55/28 |
| 2018/0065692 A1 | 3/2018 | Wodrich et al. | |
| 2024/0025498 A1 * | 1/2024 | Goodloe | B62D 55/275 |

* cited by examiner

VEHICLE TRACK PAD ASSEMBLY AND METHOD

CROSS-REFERENCE TO RELATED APPLICATIONS

This application claims priority to U.S. Provisional Application No. 63/135,536 (filed 8 Jan. 2021), the entire disclosure of which is incorporated herein by reference.

BACKGROUND

Technical Field

Examples of the subject matter herein relate to continuous track vehicles.

Discussion of Art

Continuous track vehicles (e.g., bulldozers and tanks) run on a continuous band of treads or track shoes driven by two or more wheels. For track shoes, the track shoes may be attached to one another sequentially in an articulated manner to form the continuous band. Alternatively, a chain or other set of articulated links may form the continuous band, with individual track shoes bolted to the links. Either way, the track shoes may be grouser shoes, referring to bare track shoes that include features (e.g., metal protuberances, crossbars, or other treads) for facilitating traction in loose surfaces such as mud, soft soil, sand, and snow.

While grouser shoes increase vehicle traction in loose surfaces, they may cause damage to a road surface if the vehicle is driven over a paved or sealed road. Therefore, some continuous track vehicles are outfitted with elastomeric track pads. For deployment, at least some of the grouser shoes of the vehicle are outfitted with the track pads. The track pads are attached to the undersides (ground-facing side) of the grouser shoes, and are thick enough for the vehicle to mostly or entirely stand supported on the track pads when driven on flat, paved or graded roads, thereby reducing or eliminating road damage. (When used on a loose surface, edges of the track pads may provide tractive assistance as they bite into the loose surface.) Due to heavy vehicle weight and operating conditions (e.g., turning on a relatively tight radius), track pads may be subject to significant stresses, including torsional stresses. This may result in the track pads wearing out undesirably quickly, or even the pads shearing off from the underlying metal track plate.

Therefore, it may be desirable to provide a vehicle track pad assembly that differs from existing track shoes.

BRIEF DESCRIPTION

In an example, a vehicle track pad assembly includes a track plate having a plate body with a tread surface and a polymer pad attached to the tread surface of the plate body. The track plate further includes a protruding attachment means attached to the tread surface of the plate body and to the polymer pad and disposed therebetween, for establishing a greater area of contact surface between the track plate and the polymer pad relative to a flat track plate without the protruding attachment means.

In one example, a vehicle track pad assembly includes a track plate having a plate body with a tread surface and at least one mesh array attached to the tread surface of the plate body, and a polymer pad attached to the at least one mesh array and to interstitial areas of the tread surface defined by cells of the at least one mesh array.

In another example, a vehicle includes a chassis, an articulated continuous track drive, and a plurality of the track pad assemblies that are sequentially continuously or discontinuously attached to the articulated continuous track drive. The polymer pads may contact a ground surface when the articulated continuous track drive is operated for vehicle movement.

In another example, a vehicle track pad assembly includes a track plate having a plate body with a tread surface and one or more mesh arrays attached to the tread surface, and one or more polymer pads attached to the one or more mesh arrays and to interstitial areas of the tread surface defined by the one or more mesh arrays.

In another example, a vehicle track pad assembly may include a track plate having a plate body with a tread surface and one or more mesh array assemblies attached to the tread surface. Each of the mesh array assemblies may include a mesh array and plural suspension bodies attached to a first surface of the mesh array. The plural suspension bodies may be attached to the tread surface so that the first surface of the mesh array is spaced apart from the tread surface of the track plate. One or more polymer pads may be attached to the one or more mesh array assemblies and to interstitial areas of the tread surface defined by the one or more mesh arrays. Portions of the one or more polymer pads may be disposed between the respective first surfaces of the one or more mesh arrays and the tread surface.

BRIEF DESCRIPTION OF THE DRAWINGS

The inventive subject matter may be understood from reading the following description of non-limiting examples, with reference to the attached drawings, wherein below.

DETAILED DESCRIPTION

Examples of the subject matter described herein relate to track pads for continuous track vehicles, e.g., the track pads are configured to be attached as part of a continuous track drive of such a vehicle for vehicle movement. In one aspect, a track pad assembly includes a track plate and a polymer pad. The track plate includes one or more mesh arrays and a plate body having a tread surface; the one or more mesh arrays are attached to the tread surface. The polymer pad is attached to the mesh array(s) and to interstitial areas of the tread surface defined by cells of the mesh array(s), for example by press bonding in conjunction with an adhesive. In this manner, a region of interface (contact area) between the track plate and polymer is increased (relative to designs without mesh arrays), thereby improving durability and reducing instances of pad shear separation.

Figure 1:
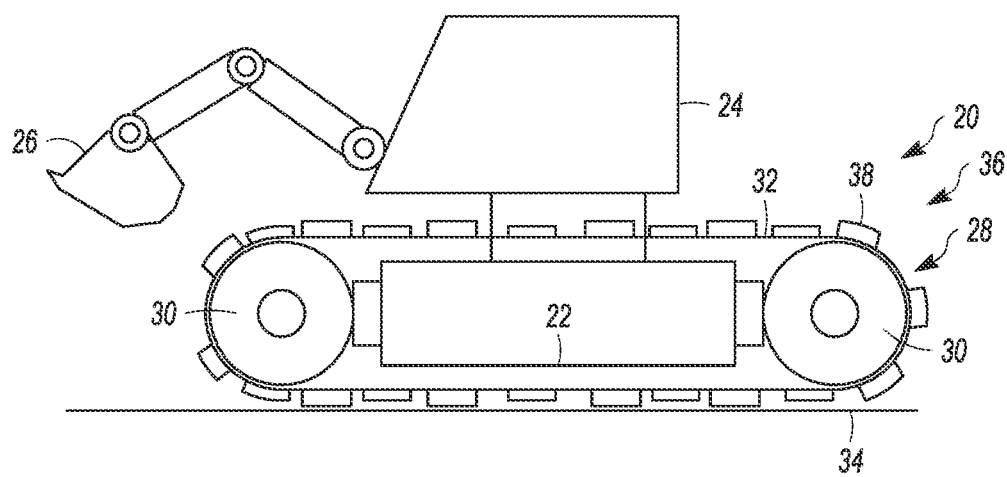
FIG. 1 is a side view of an example of a vehicle.

Turning to FIG. 1, an example of a vehicle 20 (e.g., a continuous track vehicle) includes a chassis 22, an operator cab 24 supported by the chassis, a work tool 26 (e.g., back hoe, front end dumper, scoop blade, military weapon) operably attached to the cab and/or to the chassis, and a continuous track drive 28 attached to the chassis and configured to be selectively electrically and/or mechanically powered for vehicle movement. The continuous track drive may include front and rear axle-mounted wheel units 30 and a continuous chain track 32. The chain track is operably connected to and between the two wheel units, e.g., via sprockets, such that when the wheels are rotated in concert (under operation of a motor-driven gear unit, or a transmission driven by an engine, for example), the chain track is actuated in a given direction along the ground surface 34 that supports the vehicle, for vehicle movement. The chain track includes plural track shoes 36, at least some of which may be track pad assemblies 38 as described herein. (For example, the chain track may include only track pad assemblies, or a combination of interspersed track pad assemblies and grouser shoes, and/or one or more of the track pad assemblies attached to underlying grouser shoe(s).) The track shoes may be directly connected to one another in an articulated manner to form the continuous chain track, or the track shoes may be coupled to one or more underlying continuous chains or other sets of articulated links, e.g., a continuous loop of articulated links that interconnects and is driven by the wheel units, with the track shoes attached to the links and moving along therewith.

Figure 2:
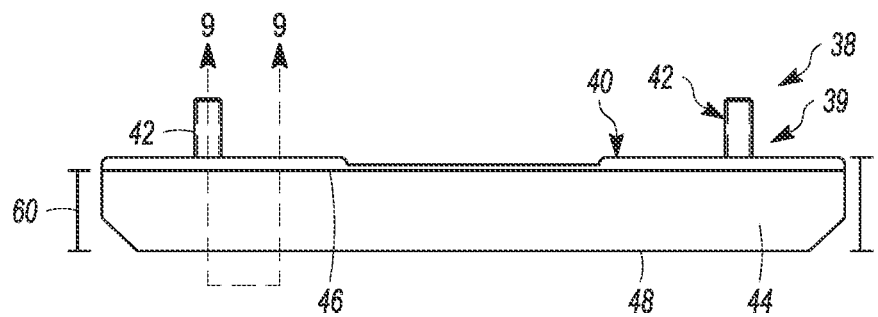
FIG. 2 is a side view of an example of a track pad assembly.
Figure 3:
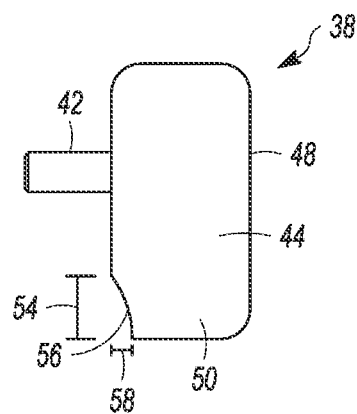
FIG. 3 is an end view of the track pad assembly shown in FIG. 2.
Figure 4:
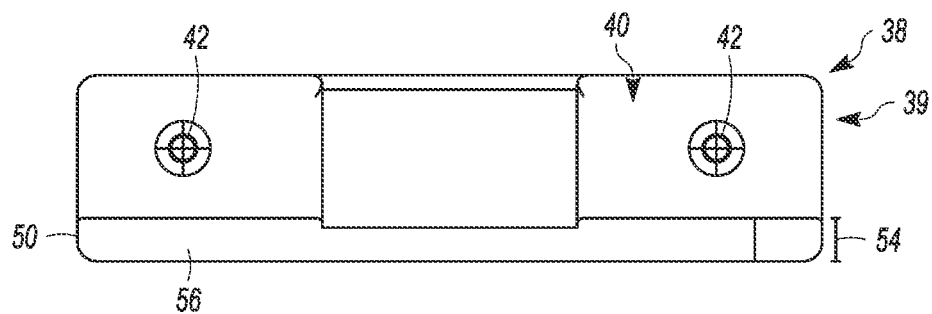
FIG. 4 is a top view of the track pad assembly shown in FIGS. 2-3.

A first example of the track pad assemblies 38 is shown in FIGS. 2-4. The track pad assembly includes a track plate 39 and one or more polymer pads 44. (One polymer pad is shown in the figures.) The track plate includes a plate body 40 and one or more fasteners 42 protruding from the plate body. The track plate and fasteners may be made of a metal, e.g., steel, titanium, or aluminum alloy; the plate and fasteners may be the same material or different materials. The fasteners may be bolts, such as hex head bolts. The plate body defines a generally flat tread surface 46, referring to the side of the plate body that would face the ground or other vehicle support surface when the track pad assembly is deployed and comes into contact with the ground during vehicle operation. The plate body is generally rectangular, meaning elongate and with two sets of parallel sides edges, with adjacent side edges meeting at either a right angle or a radiused transition, that is, rounded edges. Alternatively, the plate body may be elongate more generally, e.g., oval or figure-eight shaped.

As one example to provide dimensional context, the plate body, if made of steel, may be (approximately) from 130-150 mm wide, 600-800 mm long, and 8-12 mm thick. Other dimensions are possible depending on the plate material and vehicle characteristics.

The polymer pad 44 may be made of an elastomer such as polyurethane, hardened rubber, a thermoplastic elastomer, or another elastomer. In other examples, the polymer pad may be comprised of a thermoplastic polymer. In an example where the elastomer pad is made of hardened rubber, the hardened rubber may provide a greater degree of adhesion on certain travel surfaces, especially under wet or icy conditions, relative to other elastomers like polyurethane. In a track pad, the wear properties of hardened rubber (or other polymer) may be improved as a result of aspects of the pad-to-track plate interface as set forth herein, e.g., the mesh arrays affixed to the track plate body.

Hardened rubber refers to a rubber polymer having long molecular chains crosslinked to create chemical bonds between the chains, making it into an elastic, rather than a plastic, material. The rubber polymer may include various types of rubber such as natural rubber from rubber trees, synthetic rubber from petroleum, e.g., SBR, NBR, EPDM, Neoprene, etc., and also rubber blends. Hardened rubber may be manufactured using various types of curing systems, e.g., sulfur chemistry, peroxide chemistry, electron beam curing, room temperature curing, etc. One example of such a hardened rubber is vulcanized rubber, which refers to a hardened rubber made by curing a "raw" rubber polymer with sulfur and heat. In one example, the hardened rubber of the polymer pad comprises a blend of synthetic and natural rubber, vulcanized using a sulfur-based curing system.

The polymer pad may be generally block-shaped, that is, a generally rectangular solid. Edges of the pad may be rounded, contoured, textured, or otherwise shaped. The polymer pad may be dimensioned to correspond to the size of the plate body, so that the pad covers all or substantially all of the tread surface of the track plate, e.g., the pad may have a length and width this is the same as the length and width of the plate body. Alternatively, in other examples, one or more sides of the polymer pad may protrude out past the plate body in a lateral direction. For example, as shown in FIGS. 3-4, the polymer pad may include a long edge protrusion 50 that extends out past one of the long side edges of the track plate. According to another aspect, the long edge protrusion, on a top side of the pad opposite a bottom, tread surface 48 of the pad (the side of the polymer pad that, when installed in a vehicle and the vehicle is operated, contacts the vehicle support surface), may have a recessed lip 56, where the long edge of the pad on the top side is recessed, grooved, chamfered, or otherwise curved or angled inwards. The bottom, tread surface 48 of the polymer pad may be flat, or it may be provided with tread features, e.g., ridges, protuberances, depressions, etc., which are molded or extruded integrally or otherwise formed as part of the pad, or otherwise.

In examples, as an example: a width 54 (see FIG. 3) of the long edge protrusion may be approximately 35-45 mm; alternatively or additionally, a depth 58 of the recessed lip may be from 10-15 mm; and, alternatively or additionally, the polymer pad may have a maximum thickness 60 (see FIG. 2), in a direction normal to the plate body tread surface and extending between the track plate tread surface and the tread surface of the pad, of from 70-90 mm. Features such as the protrusion and recessed lip may be provided specially for providing desired traction properties, and/or they may be provided so that the shape/contour of the pad corresponds to the shape/contour of the underlying plate.

Figure 5:
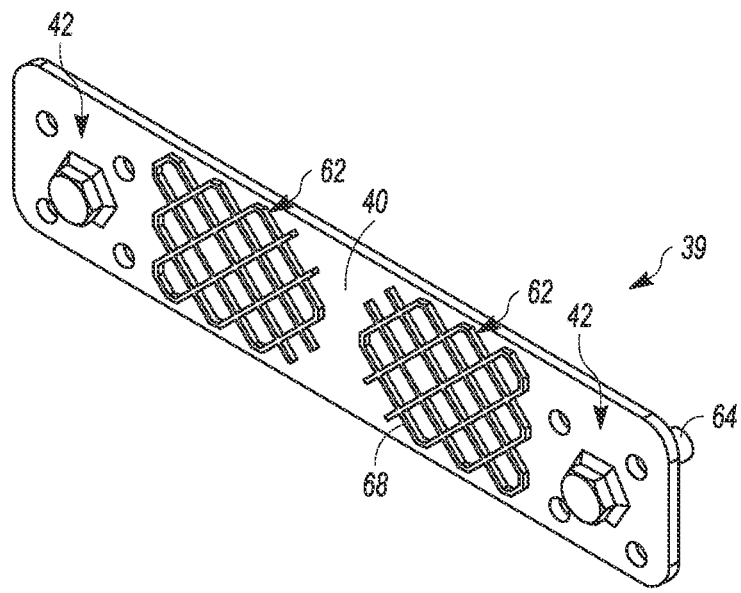
FIG. 5 is a perspective view of a bottom of a track plate with attached mesh arrays, according to one example.
Figure 6:
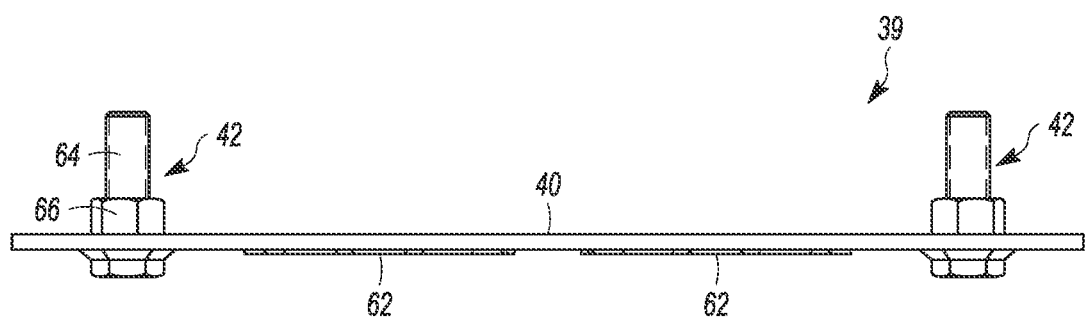
FIG. 6 is a side view of the track plate with mesh arrays of FIG. 5.
Figure 7:
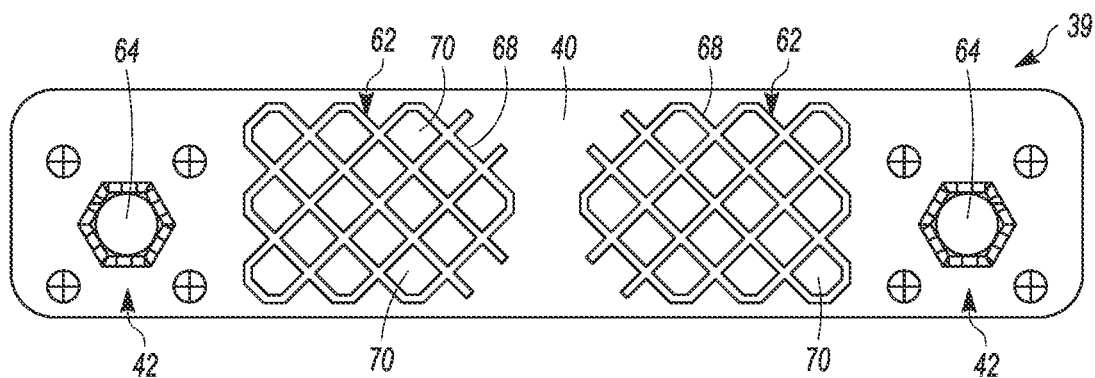
FIG. 7 is a bottom view of the track plate with mesh arrays of FIGS. 5-6.

FIGS. 5-7 show aspects of the track pad assembly with the polymer pad removed. As illustrated, the track plate 39 includes the plate body 40, the one or more fasteners 42, and one or more mesh arrays 62. The example shown has two fasteners and two mesh arrays. In this example, each fastener includes a bolt 64 (e.g., hex head bolt) that extends through an aperture (e.g., round hole) provided through the plate body. A head portion of the bolt is positioned on the tread surface side of the plate body, and a shaft portion of the bolt extends out from the top, opposite side of the plate body in a normal/perpendicular direction. The bolt is kept in place by a nut 66 (e.g., hex nut) or other retainer (e.g., other shaped nuts, pins, washers, and so on), such that the plate body is sandwiched between the bolt head and the nut. (In other examples, the fasteners could be carriage bolts, machine screws, cylindrical metal shafts welded to the plate body, etc.) Each mesh array 62 is a lattice structure of strips 68 of material crossed and interconnected together, and/or in abutment with one another (e.g., a woven structure), to define a plurality of open cells 70 therebetween. That is, the cells are regions lacking material, which thereby constitute separately defined openings in the mesh array. (The cells may be completely enclosed, as shown on the right-hand side of the right-hand array in FIG. 7, or they may be partially enclosed, as shown on the left-hand side upper and lower corners of the right-hand array in FIG. 7.) In an example, the mesh arrays may comprise a metal mesh, e.g., steel or stainless steel, such as an expanded metal mesh, a grid stamped from sheet metal, wire mesh, woven wire mesh, woven metal strip mesh, mechanically interconnected wire mesh (e.g., heavy gauge chicken wire), etc. As one example, in an example, a thickness of the mesh array in a direction normal to the tread surface of the track plate (corresponding to a maximum cross dimension of the strips of the mesh, e.g., diameter, thickness, or width) may be from 2-3 mm.

In one example, the mesh arrays are attached to the tread surface of the track plate. For example, the mesh arrays may be welded to the track plate, e.g., either entirely along all seams/regions of contact, or by way of multiple discrete weld spots (e.g., 15-25 weld spots per mesh array). Alternatively, the mesh arrays could be attached to the track plate using an adhesive, brazing, or the like. As another example, the mesh arrays could be formed as a metal powder pattern which is subsequently solidified and attached to the track plate using sintering. In another example, the mesh arrays could be integrally formed with the track plate during manufacturing of the track plate. For example, the track plate could be formed using metal casting, where the casting mold includes array-shaped grooves for forming the arrays on the track plate, as part of the metal of the track plate. Other examples include machining the track plate and arrays (from a larger starting block of metal), additive manufacturing, stamping, or the like.

The mesh arrays can have opposite surfaces with one surface (e.g., an upper surface) attached to the tread surface of the track plate and the opposite surface facing in the opposite direction (e.g., a lower surface) facing away from the tread surface of the track plate. In one example, the upper surface of the mesh array can lie directly on or directly abut the tread surface of the track plate such that no gap (e.g., air gap) or other body (the polymer of the polymer pad or another material) is disposed between the surface of the mesh array and the tread surface of the track plate. This manner of connecting the mesh arrays with the tread surface of the track plate is shown in FIG. 6. The polymer material forming the polymer pad can encapsulate the mesh array within the polymer pad. For example, the polymer material can be flow around and over the mesh array and the track pad.

Figure 13:
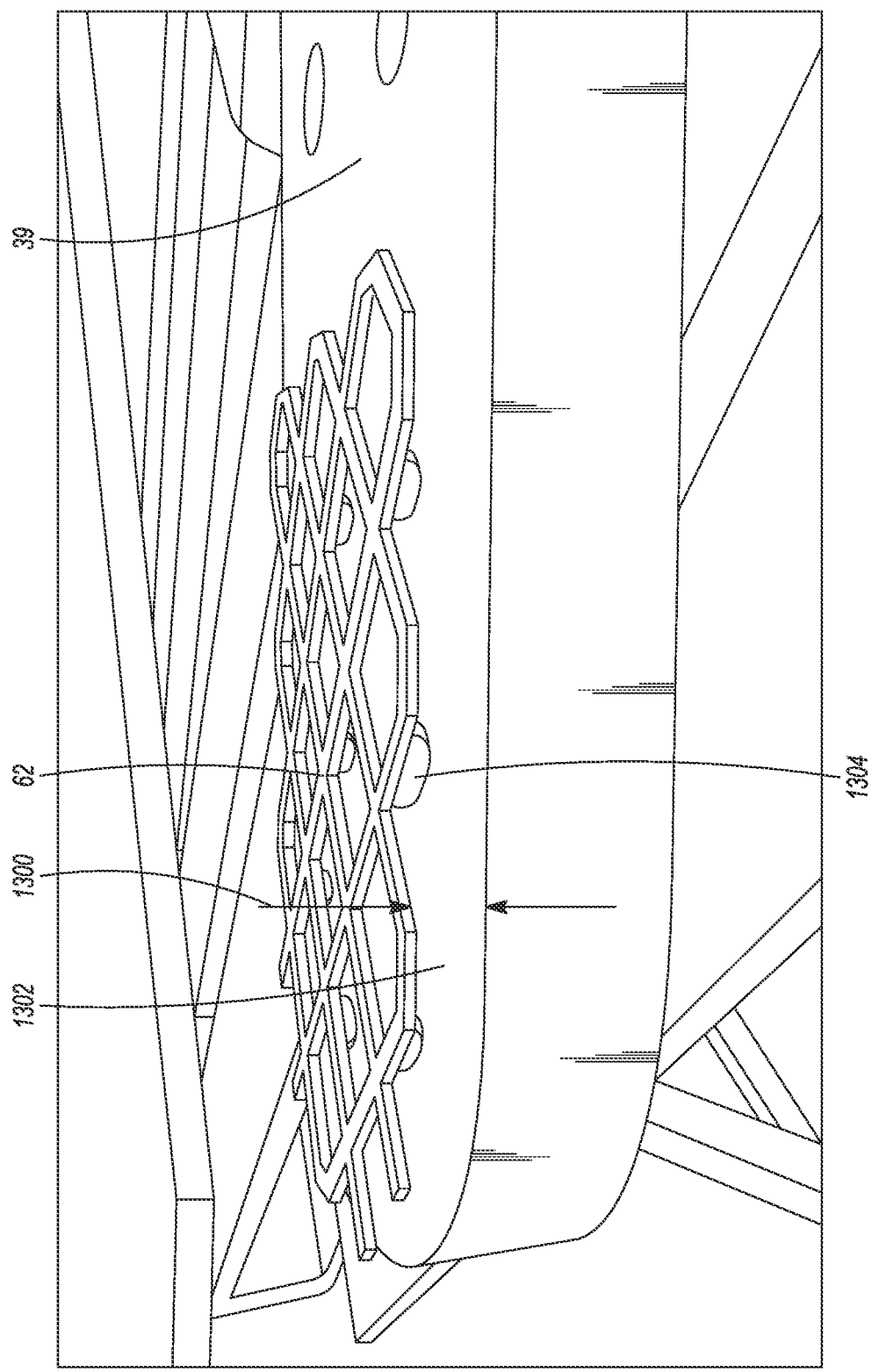
FIG. 13 illustrates one example of coupling one of the mesh arrays with the tread surface of the track plate with a gap between an upper surface of the mesh array and the tread surface.

In another example, the mesh arrays can be connected to the tread surface of the track plate with one or more gaps between the upper surface of the mesh array and the tread surface of the track plate. FIG. 13 illustrates one example of coupling one of the mesh arrays with the tread surface of the track plate with a gap 1300 between an upper surface 1302 of the mesh array and the tread surface. One or more spacers can be positioned on the tread surface of the track plate with the mesh array placed onto the spacers. The spacers suspend the mesh array above and apart from the tread surface of the track plate to create or sustain the gap. The spacers can be bodies such as washers, blocks, or the like. With the spacers in place, the mesh array can be welded or otherwise joined with the tread surface of the track plate by welds or other couplings 1304. The spacers can then be removed. These welds or other couplings can maintain the gap between the upper surface of the mesh array and the tread surface of the track plate, as shown in FIG. 6 (where the mesh array has been welded to the tread surface of the track plate). For example, the welds or other couplings can be referred to as suspension bodies that suspend the mesh array apart from the tread surface of the track plate while securing the mesh array to the tread surface. (In combination, the mesh array and suspension bodies attached thereto are referred to herein as a mesh array assembly.) Alternatively, the spacers may remain in place between the mesh array and the tread surface.

Figure 14:
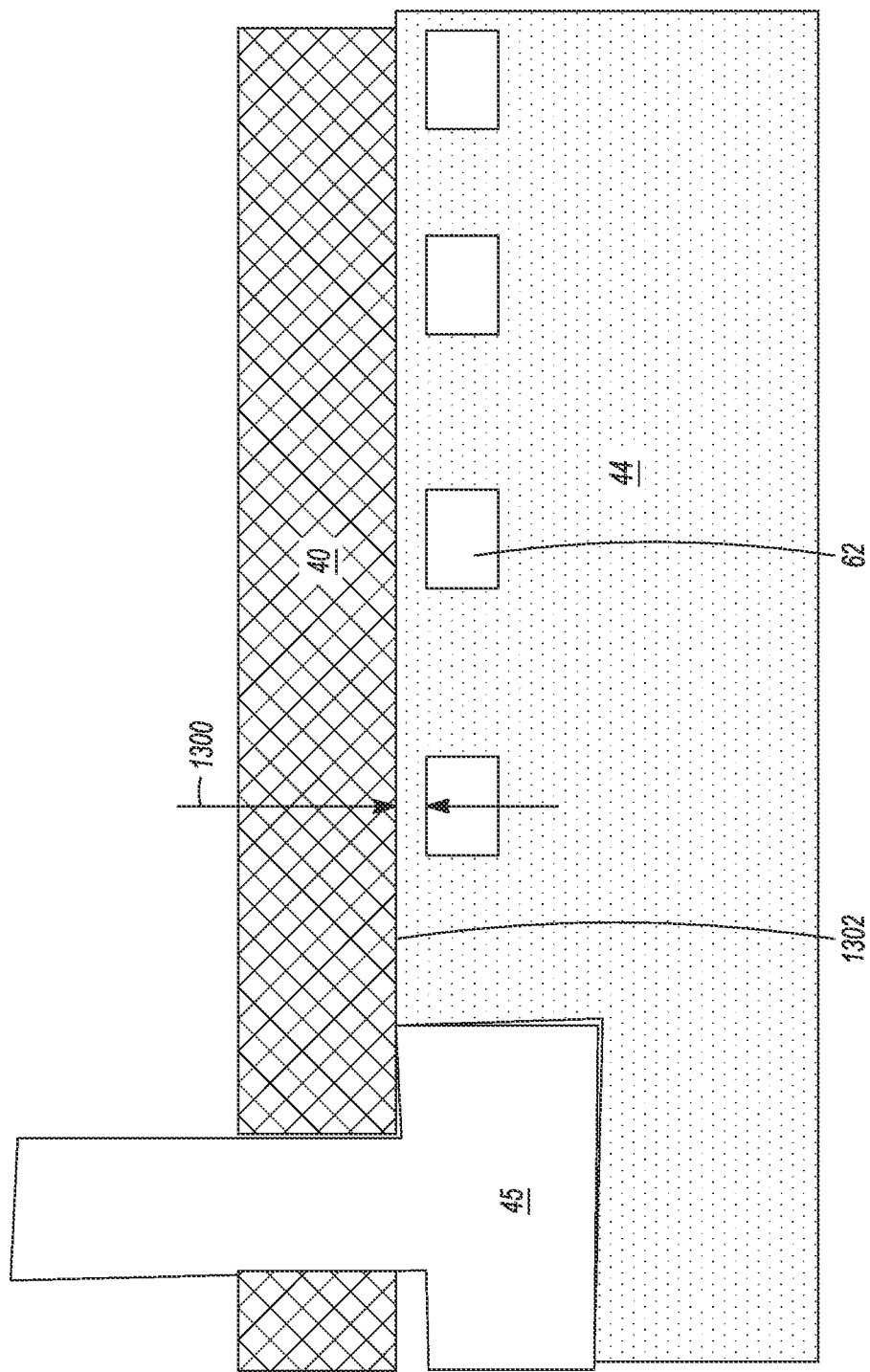
FIG. 14 illustrates a cross-sectional view of the track plate with the mesh array suspended apart from the tread surface of the track plate and the polymer pad encapsulating the mesh array.

The polymer material forming the polymer pad can then be placed around the mesh array to entirely or partially encapsulate the mesh array within the polymer pad. For example, the polymer material can be flow around and between the mesh array and the track pad before curing or solidifying between the mesh array and the tread surface of the track plate. FIG. 14 illustrates a cross-sectional view of the track plate with at least part of the mesh array suspended apart from the tread surface of the track plate and the polymer pad encapsulating the mesh array. As shown in FIG. 14, the polymer pad extends around the mesh array, including between the mesh array and the track plate. Suspending the mesh array apart from the track plate can provide more surface area of the mesh array for the polymer pad to contact. This can increase adhesion of the polymer pad to the mesh array relative to the mesh array not being spaced apart from the track plate. This also can increase adhesion of the polymer pad to the tread surface of the track plate by increasing the surface area interface between the polymer pad and the track plate. For example, instead of the polymer pad only contacting the track plate in the interstitial areas in the cells defined by the mesh array, the polymer pad may also contact the track plate in areas between the cells. Increasing this adhesion can prevent or delay delamination or other separation of the polymer pad from the mesh array and/or the track plate relative to the mesh array not being spaced apart from the track plate.

The example of FIGS. 5-7 includes a rectangular plate body and two mesh arrays. The plate body is generally elongate with a first distal end and an opposite, second distal end. The first of the two mesh arrays is positioned on one side of the plate body towards the first distal end, and the second of the two mesh arrays is positioned on the other side of the plate body towards the second distal end, with a flat, mesh-less region separating the two arrays. In other examples, there could be one mesh array only, centered between the fasteners, or there could be two elongate mesh arrays positioned on either side of the long axis of the plate, or there could be three or more mesh arrays.

Figure 8:
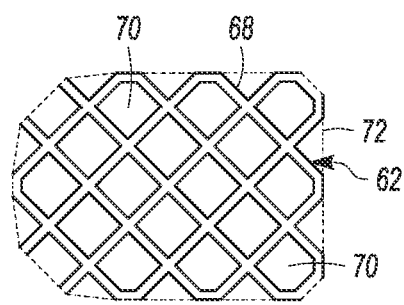
FIG. 8 shows an example of a mesh array.

In one example, a total combined area of the mesh array(s) (defined as the shortest regular boundary line that encompasses all material portions of the mesh—see line 72 in FIG. 8) is at least 15% of the total area of the tread surface of the plate body. In another example, the total combined area of the mesh array(s) is at least 20% of the total area of the tread surface of the plate body. In another example, a total combined area of the mesh array(s) is from 15%-25% of the total area of the tread surface of the plate body, reflecting that although it may be beneficial to cover at least a substantial portion, e.g., from ¼ to ⅐, of the total area (in terms of a greater degree of pad/track interface), it may not be necessary or desirable to cover most or all the plate body, to the extent possible, with mesh (although, in examples, >50% of the track plate body may be covered with mesh).

Figure 9A:
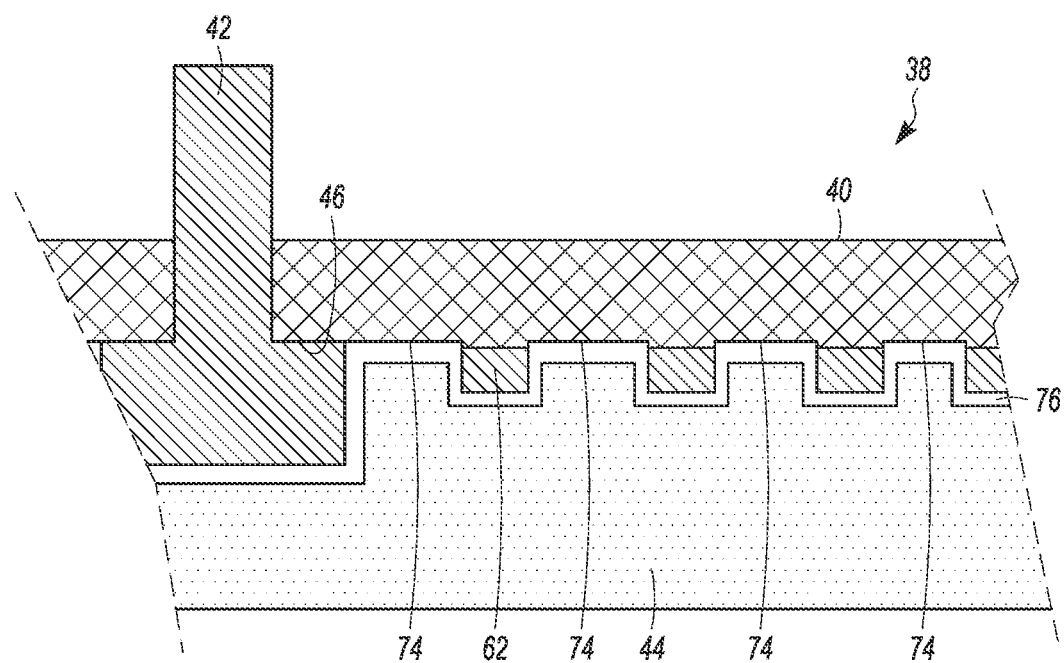
FIG. 9A is a cross-sectional view, not to scale, of the track pad assembly of FIG. 2 taken along Section 9-9.

FIG. 9A is a partial cross-sectional view of an example of the track pad assembly, with the polymer pad in place. As shown, the polymer pad is attached to the mesh array (only one mesh array is shown, but the assembly may include more than one mesh array) and to interstitial areas 74 of the tread surface of the plate body defined by the cells of the mesh array. Thereby, the pad presents a convoluted or undulating profile, where portions of the pad are disposed not only against the mesh array, but also into the cells defined by the array and against the plate body. As discussed below in more detail, such a configuration may be realized by press bonding the pad into place against the mesh array and plate body. Thereby, there may be a greater degree of contact surface between the pad and track plate relative to a flat track plate that lacks a mesh array or the like.

Figure 9B:
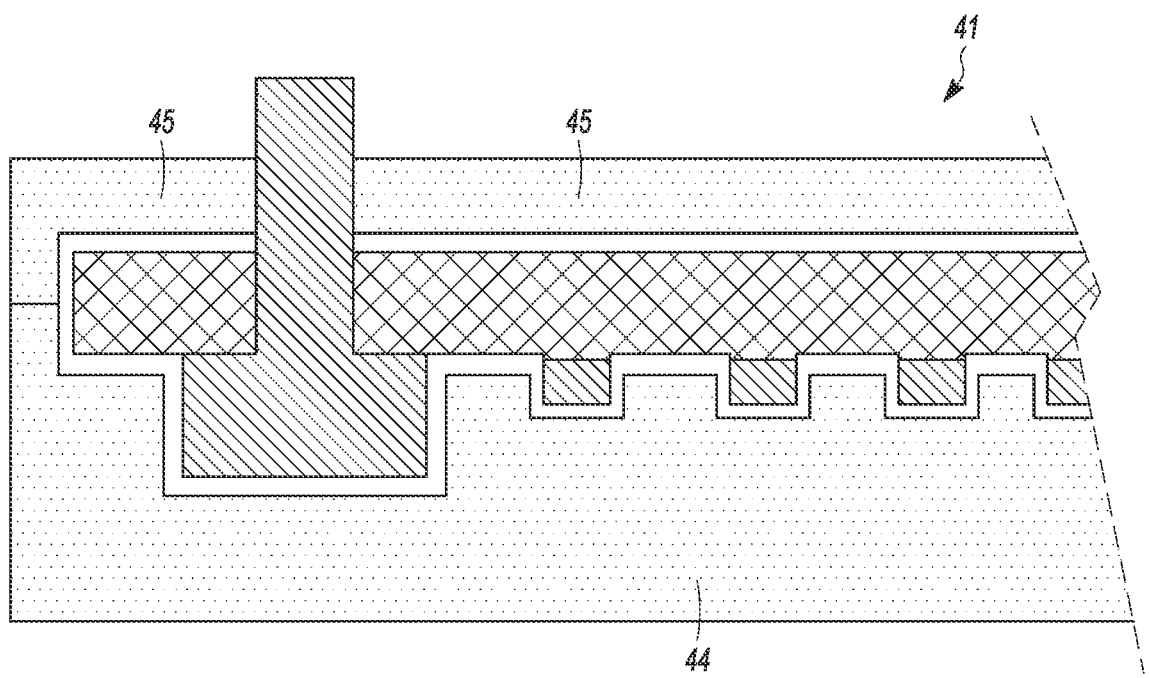
FIG. 9B is a cross-sectional view, not to scale, of an alternative example of the track pad assembly shown in FIG. 9A.

FIG. 9B shows an example of a track pad assembly 41 that is similar to the track pad assembly of FIG. 9A. However, the track pad assembly 41 includes plural polymer pads 44, 45, e.g., one pad 44 disposed on the tread surface of the plate body, and a second pad 45 disposed on the opposite, top surface of the plate body and laterally surrounding the fastener(s) (i.e., the fasteners protrude through openings in the second pad). In such an example, the plate body may be fully or at least partially enclosed or encapsulated by or within the pads. (At least partially enclosed/encapsulated means at least part of the top surface and at least part of the bottom surface of the plate body are covered by one or more polymer pads. Fully enclosed means the entireties of the top and bottom surfaces and sides of the plate body are covered by one or more polymer pads.) This illustrates that in any of the examples herein, a track pad assembly may include one or more polymer pads, which may partially or fully encapsulate the plate body. In one aspect, although FIG. 9B shows two pads fully or partially enclosing the plate body, there may be one pad that fully or partially encloses the plate body. For example, there may be two or more pad preforms or blanks disposed on either side of the plate body which are then cured (e.g., as described below) during the manufacturing process to bond and merge together at the junction therebetween. In another example, the track plate may be disposed in a mold, with a liquid polymer introduced into the mold to surround the plate body, which is then cured to harden the polymer around the plate body.

As also discussed below, the pad may be attached to the mesh array and plate body by way of a layer of adhesive 76 that is disposed between the pad and the interstitial areas and the mesh array, across some or all of the interface area of the pad and track plate. In examples, the adhesive is a polymer (e.g., elastomer)-to-metal adhesive. The type of adhesive 76 may depend on the material of the polymer pad, e.g., for a hardened rubber pad the adhesive may comprise a vulcanizing adhesive configured for polymer-to-metal bonding. For a polyurethane pad, the adhesive may comprise a vulcanizing adhesive configured for bonding cast polyurethane to metal substrates. Non-vulcanizing epoxy adhesives, either heat activated or not, might also be suitable.

The mesh arrays shown in one or more examples may be flat or planar bodies. For example, the mesh arrays may be flat and the tread surface of the track plate may be a planar surface such that the mesh arrays (and/or the surfaces of the mesh arrays that face the tread surface) and the tread surface may be parallel to each other. Alternatively, one or more portions of the mesh arrays may be contoured toward or away from the tread surface. For example, one or more outer edges of the mesh arrays may be bent toward the tread surface such that the outer edges are closer to the tread surface than other portions of the mesh arrays. Additionally or alternatively, one or more middle portions or segments of the mesh arrays that are not at the outer edges may be bent toward the tread surface of the track plate. The contoured edges or portions of the mesh arrays may contact or be coupled with (e.g., welded to) the tread surface. The contoured shapes of the mesh arrays can increase the surface areas of the mesh arrays that contact the polymer pads to thereby increase adhesion of the polymer pads to the mesh arrays and the track plates (relative to non-contoured, or flat, mesh arrays).

In an example, a method (e.g., of manufacturing a track pad assembly) may include affixing one or more mesh arrays to a tread surface of a plate body, and affixing one or more polymer pads to the one or more mesh arrays and to interstitial areas of the tread surface defined by the one or more mesh arrays (e.g., as shown in FIGS. 9A and 9B).

In another example, a method (e.g., of manufacturing a track pad assembly) may include the following steps: attaching (e.g., welding) one or more mesh arrays (e.g., metal mesh arrays) to a tread surface of a plate body (e.g., a metal plate body of a track plate); cleaning the one or more mesh arrays and tread surface after the one or more mesh arrays are attached to the tread surface; after the cleaning, applying an adhesive to the one or more mesh arrays and to interstitial areas of the tread surface defined by the one or more mesh arrays; and in conjunction with the adhesive, bonding one or more polymer pads to the one or more mesh arrays and to the interstitial areas of the tread surface.

Optionally, the method may also include a step, prior to attaching the mesh array(s) to the tread surface, of pre-cleaning at least part of the tread surface and/or the mesh array(s). This may be done, for example, if the tread surface and/or mesh array(s) are rusty or otherwise in a condition that is not conducive to attaching the mesh array(s) to the tread surface using the designated attachment method/means (e.g., welding) without cleaning.

In another example, the bonding may include press bonding the pad(s) to the mesh arrays and tread surface (of the plate body), at an elevated temperature and pressure (relative to atmospheric pressure at sea level and room temperature) for a designated time period, in a press machine. These may be, for example, the minimum conditions for vulcanizing rubber, namely, a temperature of at least 115° C., a specific pressure of at least 2 MPa (megapascals), and a time of at least 10 minutes. When press bonded at or above such pressure and temperature values for at least this time period, the material of the pad flows into the cells of the mesh array, and thereby against the plate body. Also, the adhesive is activated, creating a more secure bond between the pad and track plate (than press bonding without an adhesive).

In one aspect, a cured or other pre-manufactured/formed polymer pad may be attached to an adhesive-coated track plate by heating the pad and/or track plate and pressing the pad and track plate together (e.g., using a heated hydraulic or other press, or a hydraulic or other press located in a heated environment) for a time sufficient for the material of the pad to flow into the mesh cells against the plate body. In another aspect, a blank or preform of uncured polymer may be disposed in a heated mold along with the adhesive-coated track plate. The mold is then closed and pressed with a hydraulic or other press, at a designated minimum temperature and pressure for a minimum time, as set forth herein, to simultaneously cure the pad material and bond it to the track plate. Such a method may also be used for manufacturing the track pad assembly shown in FIG. 9B, e.g., multiple blanks or preforms of uncured polymer may be disposed in a heated mold along with the adhesive-coated track plate disposed therebetween, where, during the curing process (elevated temperature and pressure), the blanks/preforms are both cured and bonded to the track plate and to one another to at least partially enclose the track plate body.

In another example, the one or more mesh arrays of the track pad assembly may include a track plate that has an array of recesses disposed in the plate body tread surface. For example, the tread surface could be machined, stamped, cut, etched, etc. to remove material from the plate body in the pattern of an array of grooves, cutouts, holes, or other recesses that form one or more mesh arrays. Then, the polymer pad would be attached to the track plate similarly to as described above, e.g., press bonding with an adhesive, such that the pad would lie in contact and attached to the tread surface within the recesses.

Figure 10:
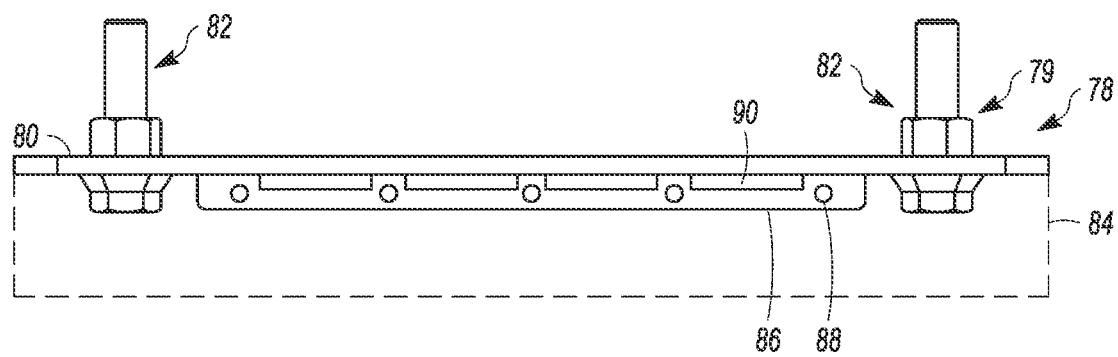
FIG. 10 is a side view of another example of a track pad assembly.
Figure 11:
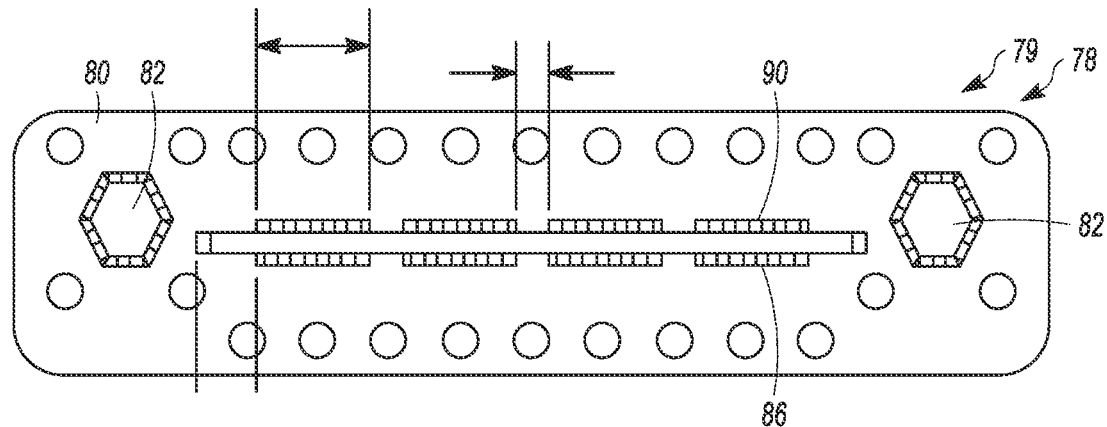
FIG. 11 is a top view of part of the track pad assembly of FIG. 10.

FIGS. 10 and 11 show another example of a track pad assembly 78. The track pad assembly includes a track plate 79 and one or more polymer pads 84. One polymer pad is shown schematically in FIG. 10 for illustrating underlying components; the track pad assembly is shown with the polymer pad removed in FIG. 11. The track plate 79 includes a plate body 80, one or more fasteners 82 (e.g., similar to the fasteners 42 in FIGS. 2-9), and one or more mesh arrays formed by spines 86 attached to the plate body. Each spine is an elongate strip of material (e.g., metal) attached perpendicularly along its long axis to the tread surface of the plate body, e.g., by welding at weld points or weld lines 90. A thickness of the spine may be the same as the thickness of the plate body. In the example of FIGS. 10-11, the track plate includes only one elongate spine positioned at and along the long center axis of the plate body, approximately evenly disposed between the two fasteners. In other examples, the mesh array(s) can include or be two or more spines, positioned similarly, and/or positioned crosswise (perpendicular to the long axis of the plate body), and/or angled, etc. When the polymer pad is press bonded to the track plate, the pad will conform to the shape of the spine, with the spine thereby being embedded in the polymer pad. Thereby, taking the spine and plate body tread surface in combination, there is a greater degree of contact surface between the pad and track plate (relative to flat track plates), which may improve wear resistance and reduce instances of pad shear separation.

The spine(s) may include one or more holes or other apertures 88 for reducing weight and/or providing a greater degree of surface area connection between the polymer pad and spine. Alternatively or additionally, the spine(s) may include one or more feet, attached to the strip of material along its bottom edge (the edge connected to the plate body) and extending out perpendicularly therefrom, to establish a larger contact surface area between the spine and plate body, relative to a spine without feet.

Figure 12:
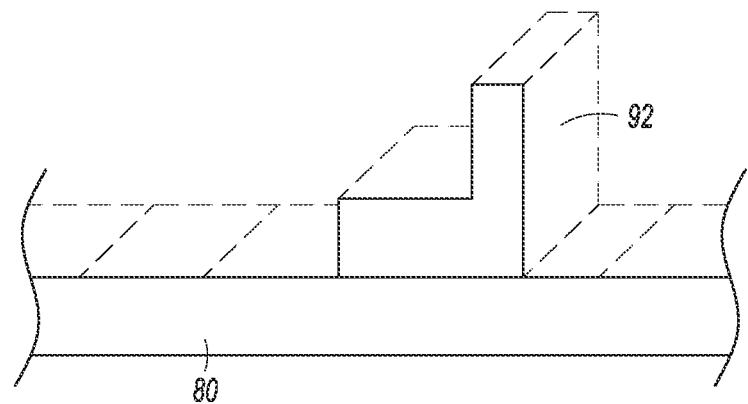
FIG. 12 is a side view of another example of a track plate.

With reference to FIG. 12, the mesh arrays may include one or more (e.g., plural) tabs 92, such as metal L-tabs, welded or otherwise attached to the tread surface of the plate body. For example, there might be from four to eight (or more) such tabs positioned across the tread surface. Each tab would include a base for affixing to the plate body, and an upright portion integral with the base and oriented generally perpendicular to the tread surface. Such tabs might be relatively inexpensive to procure as a staple product, and easy to attach by a single point of spot welding, for example.

In an example, a vehicle track pad assembly includes a track plate having a plate body with a tread surface and a polymer pad attached to the tread surface of the plate body. The track plate further includes a protruding attachment means attached to the tread surface of the plate body and to the polymer pad and disposed therebetween, for establishing a greater area of contact surface between the track plate and the polymer pad relative to a flat track plate without the protruding attachment means. By "protruding," it is meant the attachment means comprises one or more structures, configured for bonding with the polymer pad (e.g., alone, or with an adhesive, through press bonding or otherwise), that protrude out from the flat plane defined by the tread surface of the plate body, such that when the polymer pad is affixed to the track plate on the tread surface of the plate body, the structures lie embedded in the polymer pad. Examples of the pad attachment means include the mesh arrays, spines, and/or tabs.

As noted above, in examples, the polymer (elastomer) pad may comprise polyurethane, e.g., a thermosetting polyurethane. In one aspect, such a pad may be manufactured by pouring a liquid polyurethane polymer mix into a mold (casting) and then curing it in the mold at atmospheric pressure and with the mold heated to about 100° C. (e.g., plus or minus 5 degrees). This may be done before the pad is attached to the adhesive-coated track plate, that is, the pad is molded and cured to form a solid body, and then the solid body is attached to the track plate using a subsequent press bonding process at elevated temperature and pressure. Alternatively, the adhesive-coated track plate may be disposed in the mold with the liquid polyurethane polymer mix poured into the mold at least partially around the track plate body; curing (e.g., heating) the polymer results in it being both solidified and bonded to the track plate.

In any of the examples herein, the track pad assembly may be configured to replace a grouser shoe or other track shoe of a continuous track drive, such that the track pad assembly fully replaces the shoe in operation of the track drive (e.g., the track pad assembly is configured to be attached to a chain or other link portion of the drive to which all the shoes are attached; such as a "bolt-to-chain" configuration). Alternatively, the track pad assembly may be configured to be attached to an existing grouser shoe or other track for use. For example, the fasteners of the track pad assembly may be dimensioned, positioned, and/or otherwise configured for insertion into existing apertures in a grouser shoe or other shoe, such that when nuts (or the like) are affixed to the fasteners on the rear of the shoe where the ends of the fasteners stick through and protrude, the track pad assembly (having a plate body and polymer pads(s)) firmly abuts and is attached to the shoe for operating along therewith. In another aspect, grouser or other shoes, if lacking apertures, or if lacking appropriately spaced apertures, may be provided with apertures, e.g., using a drill, that correspond to the fasteners of the track pad assembly (e.g., in terms of dimension and spacing between the apertures).

In one example, a vehicle track pad assembly includes a track plate having a plate body with a tread surface and at least one mesh array attached to the tread surface of the plate body, and a polymer pad attached to the at least one mesh array and to interstitial areas of the tread surface defined by cells of the at least one mesh array.

The assembly also may include an adhesive disposed on one or more of the at least one mesh array or the interstitial areas of the tread surface. The polymer pad may be bonded by the adhesive to the at least one mesh array and the interstitial areas of the tread surface. The polymer pad may be press bonded to the tread surface, with at least one mesh array and adhesive for the polymer pad to lie in contact with the at least one mesh array and the tread surface within the cells defined by the least one mesh array.

The plate body may be metal, and the at least one mesh array may be a metal mesh array welded to the tread surface. The at least one mesh array may include opposite first and second surfaces and is joined with the track plate with the first surface directly contacting the tread surface of the track plate. The at least one mesh array may include opposite first and second surfaces and may be joined with the track plate with a gap between the first surface and the tread surface of the track plate and the second surface facing away from the tread surface of the track plate. The polymer pad may extend between the first surface of the at least one mesh array and the tread surface of the track plate.

The at least one mesh array may include separate first and second mesh arrays separated from one another by a meshless region of the tread surface. The first mesh array may be positioned on a first distal side of the body and the second mesh array may be positioned on a second distal side of the generally rectangular or elongate plate body.

The track plate may also include plural fasteners attached to the plate body and may attach the assembly to an articulated continuous track drive of a continuous track vehicle.

In another example, a vehicle includes a chassis, an articulated continuous track drive, and a plurality of the track pad assemblies that are sequentially continuously or discontinuously attached to the articulated continuous track drive. The polymer pads may contact a ground surface when the articulated continuous track drive is operated for vehicle movement.

In another example, a vehicle track pad assembly includes a track plate having a plate body with a tread surface and one or more mesh arrays attached to the tread surface, and one or more polymer pads attached to the one or more mesh arrays and to interstitial areas of the tread surface defined by the one or more mesh arrays.

The assembly also may include an adhesive disposed on the one or more mesh arrays or the interstitial areas of the tread surface. The one or more polymer pads may be bonded by the adhesive to the one or more mesh arrays and the interstitial areas of the tread surface. The adhesive may include a vulcanizing adhesive. The plate body may be metal, and the one or more mesh arrays may be metal mesh arrays that are welded to the tread surface. At least one of the one or more polymer pads may be formed of hardened rubber.

Each of the mesh arrays may include opposite first and second surfaces with the mesh arrays joined to the track plate with the first surfaces facing the tread surface of the track plate. The first surfaces of the one or more mesh arrays may be directly coupled to the tread surface of the track plate. The first surfaces of the one or more mesh arrays may be spaced apart from the tread surface of the track plate. The one or more polymer pads may extend between the first surfaces of the one or more mesh arrays and the tread surface of the track plate.

In another example, a vehicle track pad assembly may include a track plate having a plate body with a tread surface and one or more mesh array assemblies attached to the tread surface. Each of the mesh array assemblies may include a mesh array and plural suspension bodies attached to a first surface of the mesh array. The plural suspension bodies may be attached to the tread surface so that the first surface of the mesh array is spaced apart from the tread surface of the track plate. One or more polymer pads may be attached to the one or more mesh array assemblies and to interstitial areas of the tread surface defined by the one or more mesh arrays. Portions of the one or more polymer pads may be disposed between the respective first surfaces of the one or more mesh arrays and the tread surface.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the examples, including the best mode, and to enable a person of ordinary skill in the art to practice the examples, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle track pad assembly comprising:
a track plate having a plate body with a tread surface and at least one mesh array attached to the tread surface of the plate body, wherein the tread surface comprises interstitial areas defined by cells of the at least one mesh array; and
a polymer pad attached to the at least one mesh array and to the interstitial areas of the tread surface defined by the cells of the at least one mesh array.

2. The assembly of claim 1, further comprising:
an adhesive disposed on one or more of the at least one mesh array or the interstitial areas of the tread surface, wherein the polymer pad is bonded by the adhesive to the at least one mesh array and the interstitial areas of the tread surface.

3. The assembly of claim 1, wherein the polymer pad is press bonded to the tread surface, at least one mesh array, and adhesive for the polymer pad to lie in contact with the at least one mesh array and the tread surface within the cells defined by the least one mesh array.

4. The assembly of claim 1, wherein the plate body is metal, and the at least one mesh array is a metal mesh array welded to the tread surface.

5. The assembly of claim 1, wherein the at least one mesh array includes opposite first and second surfaces and is joined with the track plate with the first surface directly contacting the tread surface of the track plate.

6. The assembly of claim 1, wherein the at least one mesh array includes opposite first and second surfaces and is joined with the track plate with a gap between the first surface and the tread surface of the track plate and the second surface facing away from the tread surface of the track plate.

7. The assembly of claim 6, wherein the polymer pad extends between the first surface of the at least one mesh array and the tread surface of the track plate.

8. The assembly of claim 1, wherein the at least one mesh array comprises separate first and second mesh arrays separated from one another by a mesh-less region of the tread surface.

9. The assembly of claim 8, wherein the first mesh array is positioned on a first distal side of the plate body and the second mesh array is positioned on a second distal side of the plate body.

10. The assembly of claim 1, wherein the track plate further comprises plural fasteners attached to the plate body and configured to attach the assembly to an articulated continuous track drive of a continuous track vehicle.

11. A vehicle comprising:
a chassis;
an articulated continuous track drive; and
a plurality of the track pad assemblies of claim 1 sequentially continuously or discontinuously attached to the articulated continuous track drive, wherein the polymer pads are configured to contact a ground surface when the articulated continuous track drive is operated for vehicle movement.

12. A vehicle track pad assembly comprising:
a track plate having a plate body with a tread surface and one or more mesh arrays attached to the tread surface, wherein the tread surface comprises interstitial areas defined by the one or more mesh arrays; and
one or more polymer pads attached to the one or more mesh arrays and to the interstitial areas of the tread surface defined by the one or more mesh arrays.

13. The assembly of claim 12, further comprising:
an adhesive disposed on the one or more mesh arrays or the interstitial areas of the tread surface, wherein the one or more polymer pads are bonded by the adhesive to the one or more mesh arrays and the interstitial areas of the tread surface.

14. The assembly of claim 13, wherein the adhesive comprises a vulcanizing adhesive.

15. The assembly of claim 12, wherein the plate body is metal, and the one or more mesh arrays are metal mesh arrays welded to the tread surface.

16. The assembly of claim 12, wherein at least one of the one or more polymer pads is comprised of hardened rubber.

17. The assembly of claim 12, wherein each of the mesh arrays includes opposite first and second surfaces with the mesh arrays joined to the track plate with the first surfaces facing the tread surface of the track plate.

18. The assembly of claim 17, wherein the first surfaces of the one or more mesh arrays are directly coupled to the tread surface of the track plate.

19. The assembly of claim 17, wherein the first surfaces of the one or more mesh arrays are spaced apart from the tread surface of the track plate.

20. The assembly of claim 17, wherein the one or more polymer pads extend between the first surfaces of the one or more mesh arrays and the tread surface of the track plate.

21. A vehicle track pad assembly comprising:
a track plate having a plate body with a tread surface and one or more mesh array assemblies attached to the tread surface, wherein each of the mesh array assemblies includes a mesh array and plural suspension bodies attached to a first surface of the mesh array, wherein the plural suspension bodies are attached to the tread surface so that the first surface of the mesh array is spaced apart from the tread surface of the track plate, and wherein the tread surface comprises interstitial areas defined by the one or more mesh arrays; and
one or more polymer pads attached to the one or more mesh array assemblies and to the interstitial areas of the tread surface defined by the one or more mesh arrays, wherein portions of the one or more polymer pads are disposed between the respective first surfaces of the one or more mesh arrays and the tread surface.

* * * * *